(12) United States Patent
Yoon et al.

(10) Patent No.: US 11,841,502 B2
(45) Date of Patent: *Dec. 12, 2023

(54) REFLECTIVE POLARIZER FOR AUGMENTED REALITY AND VIRTUAL REALITY DISPLAY

(71) Applicant: META PLATFORMS TECHNOLOGIES, LLC, Menlo Park, CA (US)

(72) Inventors: Youngshik Yoon, Cupertino, CA (US); Richard Han-Soo Cho, Sunnyvale, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/918,891

(22) Filed: Jul. 1, 2020

(65) Prior Publication Data
US 2020/0333596 A1  Oct. 22, 2020

Related U.S. Application Data

(63) Continuation of application No. 15/670,985, filed on Aug. 7, 2017, now Pat. No. 10,739,586.

(51) Int. Cl.
*G02B 27/01* (2006.01)
*G02B 5/30* (2006.01)
(Continued)

(52) U.S. Cl.
CPC ....... *G02B 27/0101* (2013.01); *G02B 5/3025* (2013.01); *G02B 27/0176* (2013.01);
(Continued)

(58) Field of Classification Search
CPC .............. G02B 27/0101; G02B 5/3025; G02B 27/0176; G06F 3/013; G06T 19/006
(Continued)

(56) References Cited

U.S. PATENT DOCUMENTS 5,345,281 A * 9/1994 Taboada ................. A61B 3/113
351/209
5,975,703 A 11/1999 Holman et al.
(Continued)

OTHER PUBLICATIONS

Yoon, Office Action, U.S. Appl. No. 15/670,985, dated Jul. 22, 2019, 12 pgs.
(Continued)

*Primary Examiner* — James R Greece
(74) *Attorney, Agent, or Firm* — Morgan, Lewis & Bockius LLP (57) ABSTRACT

A head-mounted display device includes a first reflective polarizer having a first optical surface and a second optical surface that is opposite to the first optical surface. The first optical surface of the first reflective polarizer is curved, and the first reflective polarizer is configured to reflect light having a first polarization. The head-mounted display device also includes a first electronic display configured to project toward the first reflective polarizer a light pattern. At least a portion of the light pattern is reflected by the first reflective polarizer. Also disclosed is a method, which includes directing a light pattern from the first electronic display toward the first reflective polarizer and reflecting at least a portion of the light pattern toward an eye of a user.

17 Claims, 8 Drawing Sheets

(51) Int. Cl.
*G06F 3/01* (2006.01)
*G06T 19/00* (2011.01)

(52) U.S. Cl.
CPC ............ *G06F 3/013* (2013.01); *G06T 19/006* (2013.01); *G02B 2027/0178* (2013.01)

(58) Field of Classification Search
USPC ......................................................... 359/630
See application file for complete search history.

(56) References Cited

U.S. PATENT DOCUMENTS

| | | | |
|---|---|---|---|
| 9,557,568 B1* | 1/2017 | Ouderkirk | B29D 11/0073 |
| 10,282,912 B1 | 5/2019 | Yuan et al. | |
| 2012/0194418 A1* | 8/2012 | Osterhout | G02B 27/0149 |
| | | | 345/156 |
| 2013/0322810 A1* | 12/2013 | Robbins | G06T 19/006 |
| | | | 385/11 |
| 2015/0378074 A1* | 12/2015 | Kollin | G02B 5/3016 |
| | | | 359/485.05 |
| 2017/0176751 A1 | 6/2017 | Ouderkirk et al. | |
| 2017/0255015 A1 | 9/2017 | Geng et al. | |

OTHER PUBLICATIONS

Yoon, Final Office Action, U.S. Appl. No. 15/670,985, dated Dec. 23, 2019, 12 pgs.

Yoon, Office Action, U.S. Appl. No. 15/670,985, dated Mar. 3, 2020, 5 pgs.

Yoon, Notice of Allowance, U.S. Appl. No. 15/670,985, dated Mar. 3, 2020, 9 pgs.

* cited by examiner

REFLECTIVE POLARIZER FOR AUGMENTED REALITY AND VIRTUAL REALITY DISPLAY

RELATED APPLICATION

This application is a continuation application of U.S. patent application Ser. No. 15/670,985, entitled "Reflective Polarizer for Augmented Reality and Virtual Reality Display" filed Aug. 7, 2017, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user.

The use cases of head-mounted display devices include augmented reality, in which computer-generated images or objects are overlaid on real world images. The augmented reality can enhance a user's perception of the real-world, as additional information about the real-world environment can be provided in real-time.

For augmented reality operations, head-mounted display devices often include cameras to obtain the real-world background image. This requires high-resolution high-frame rate cameras, which can be large and heavy and in turn, increase the size and weight of the head-mounted display devices, which can reduce the user satisfaction with such devices.

SUMMARY

Accordingly, there is a need for head-mounted displays that perform augmented reality operations without the increased weight and size.

The above deficiencies and other problems associated with conventional head-mounted displays are reduced or eliminated by the disclosed display devices. In some embodiments, the devices are head-mounted display devices. In some embodiments, the devices are portable.

In accordance with some embodiments, a head-mounted display device includes a first reflective polarizer having a first optical surface and a second optical surface that is opposite to the first optical surface. The first optical surface of the first reflective polarizer is curved, and the first reflective polarizer is configured to reflect light having a first polarization. The head-mounted display device also includes a first electronic display configured to project toward the first reflective polarizer a light pattern. At least a portion of the light pattern is reflected by the first reflective polarizer.

In accordance with some embodiments, a display device includes a first reflective polarizer having a first optical surface and a second optical surface that is opposite to the first optical surface. The first optical surface of the first reflective polarizer is curved, and the first reflective polarizer is configured to reflect light having a first polarization. The display device also includes a first electronic display configured to project toward the first reflective polarizer a light pattern. At least a portion of the light pattern is reflected by the first reflective polarizer toward an eye of a user.

In accordance with some embodiments, a method includes directing a light pattern from a first electronic display toward a first reflective polarizer having a first optical surface and a second optical surface that is opposite to the first optical surface. The first optical surface of the first reflective polarizer is curved. The method further includes reflecting, with the first reflective polarizer, at least a portion of the light pattern toward an eye of a user.

Thus, the disclosed embodiments provide display devices that can perform augmented reality operations without requiring high-resolution high-frame rate cameras. Such display devices have reduced weight and size, which, in turn, increases user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

Conventional head-mounted displays include cameras to obtain background real-world images, which are subsequently mixed with computer-generated images and projected from display elements. For rendering high-quality real-time images, conventional head-mounted displays require high-resolution high frame rate cameras, which can be large and heavy. As a result, the overall size and weight of the head-mounted displays are increased, which, in turn, reduce the user satisfaction with such devices. Thus, there is a need for a head-mounted display that is light and compact and yet, capable of performing augmented reality operations.

The disclosed embodiments, by utilizing a reflective polarizer, to transmit real-world images and reflect computer-generated images. This allows augmented reality operations without requiring a separate high-resolution high frame rate camera, which reduces the size and weight of the head-mounted displays. In some embodiments, the display device includes an additional optical element, which is used to convert a display device in an augmented reality mode to a virtual reality mode. Thus, the display device is capable of performing both augmented reality operations and virtual reality operations.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first polarizer could be termed a second polarizer, and, similarly, a second polarizer could be termed a first polarizer, without departing from the scope of the various described embodiments. The first polarizer and the second polarizer are both polarizers, but they are not the same polarizer.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1:
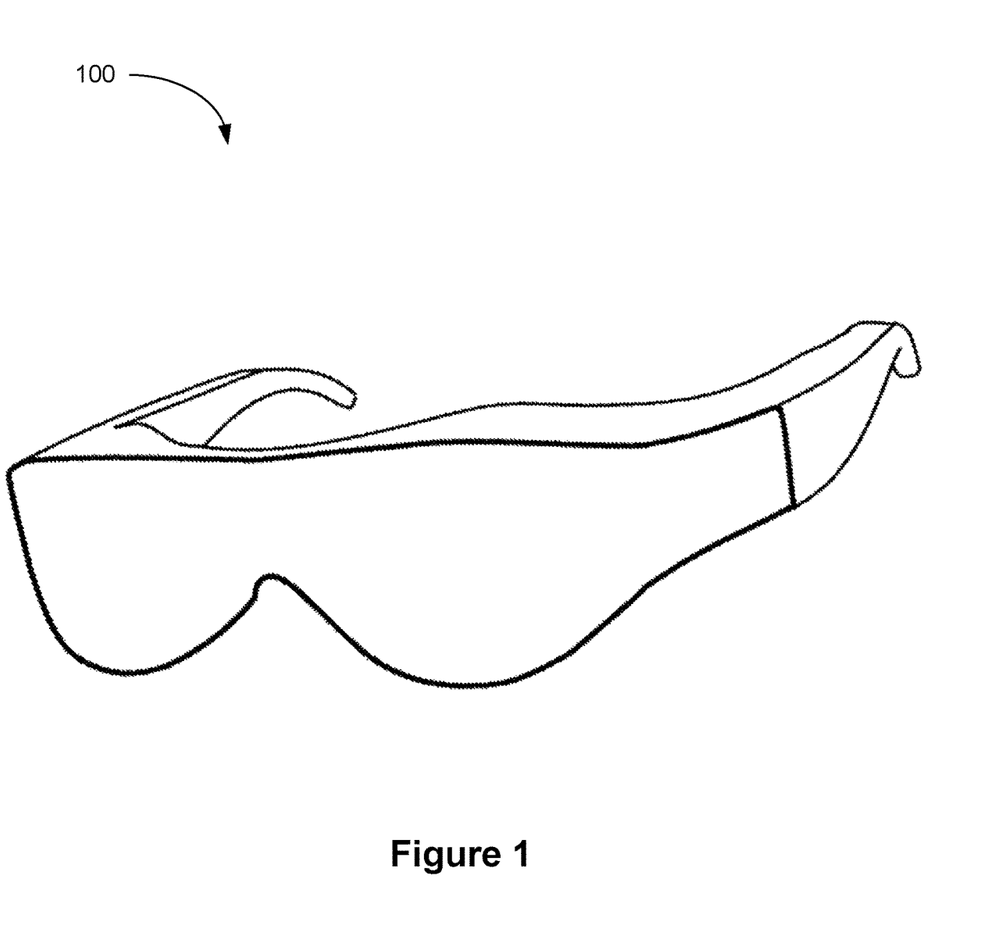
FIG. 1 is a perspective view of a display device in accordance with some embodiments.

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
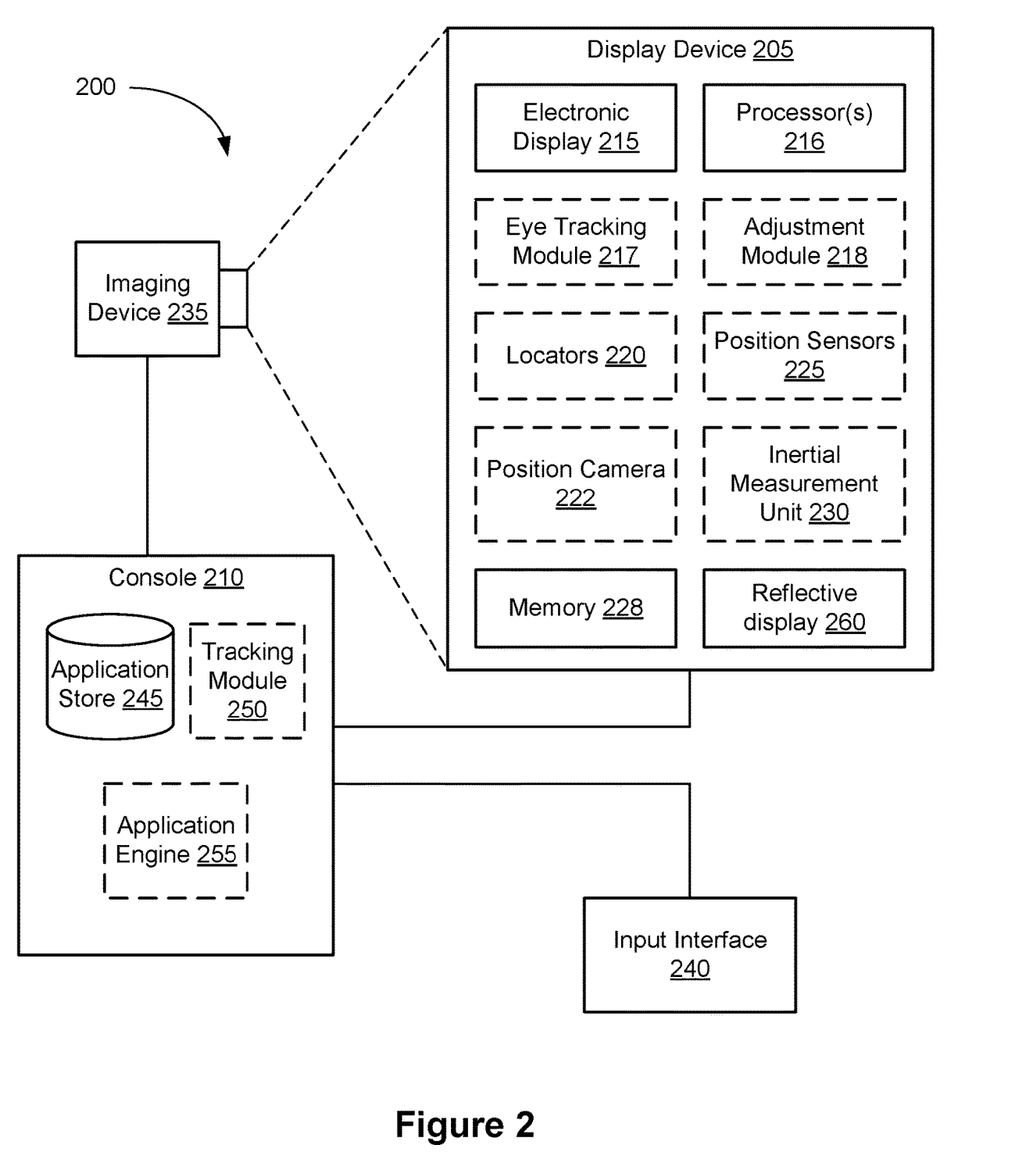
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more reflective elements 260. In some embodiments, electronic display device 205 includes a single reflective element 260 or multiple reflective elements 260 (e.g., a reflective element 260 for each eye of a user). In some embodiments, electronic display device 215 projects computer-generated images on one or more reflective elements 260, which then reflects the images toward user's eye. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
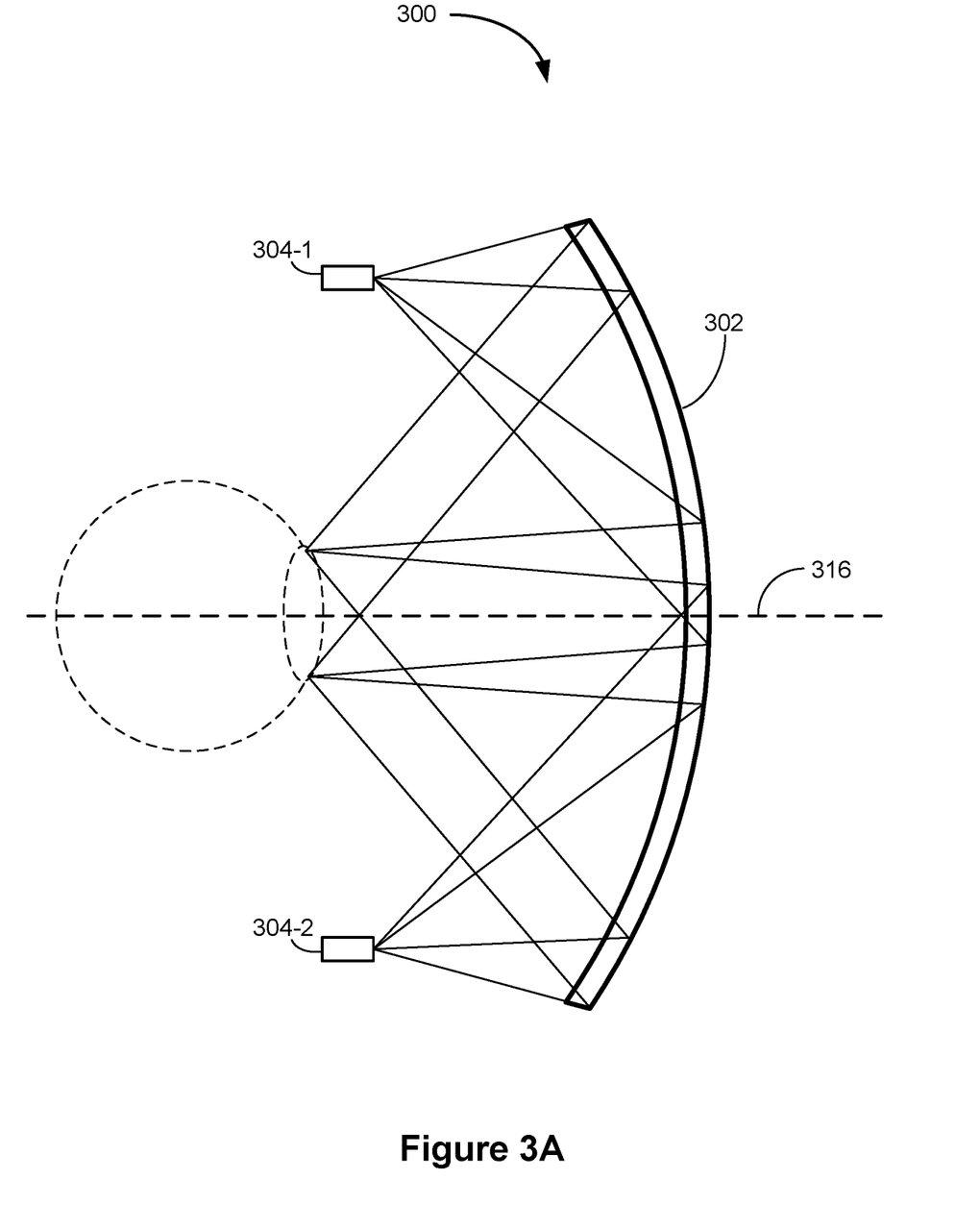
FIGS. 3A and 3B illustrate a reflective display device in accordance with some embodiments.
Figure 3B:
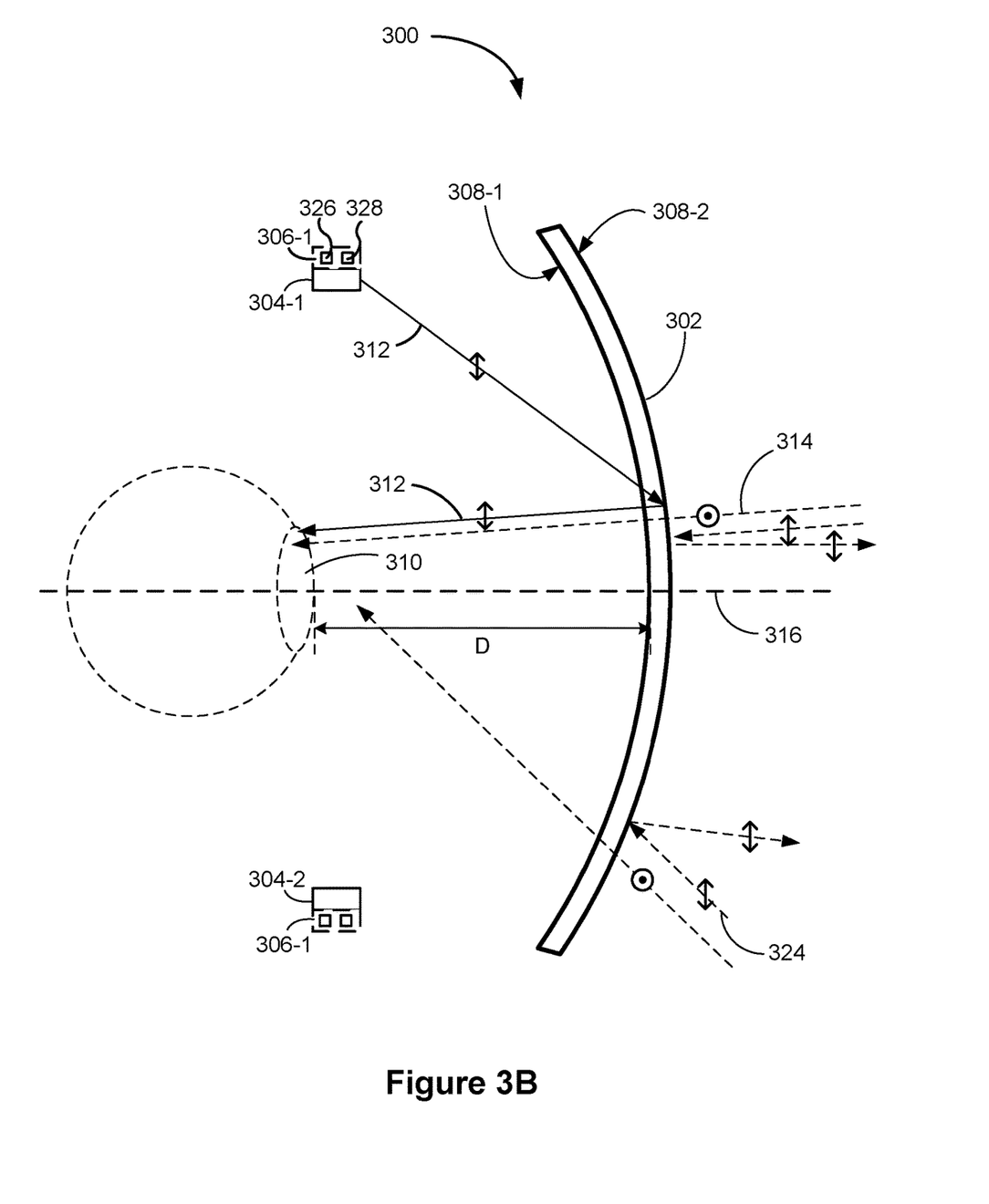

FIGS. 3A and 3B illustrate reflective display device 300 in accordance with some embodiments. In some embodiments, display device 100 described with respect to FIG. 1 includes one or more reflective display devices 300. In some embodiments, display device 100 includes two reflective display devices (e.g., one for each eye of a user).

In FIG. 3A, reflective display device 300 includes reflective polarizer 302, and one or more electronic displays (e.g., electronic displays 304-1 and 304-2). Reflective polarizer 302 is an example of reflective element 260 described above with respect to FIG. 2. In some embodiments, electronic display 304-1 corresponds to electronic display 215 described above with respect to FIG. 2. In some embodiments, electronic display 304-1 includes an array of LEDs, an array of microLEDs, an array of OLEDs, or some combination thereof. Electronic display 304-1 is configured to project light in the visible light and optionally in the IR. In some embodiments, the light projected by electronic display 304-1 is polarized (e.g., electronic display 304-1 projects linearly or circularly polarized light). In some embodiments, reflective display device 300 includes three or more electronic displays (e.g., three electronic displays, four electronic displays, etc.). In some embodiments, reflective display device 300 includes only one electronic display.

As shown in FIG. 3A, reflective polarizer 302 reflects at least a portion of light (e.g., light having a particular polarization) from the one or more electronic displays.

The configurations and operations of reflective polarizer 302 are described further with respect to FIG. 3B.

As shown in FIG. 3B, reflective polarizer 302 has surface 308-1 and surface 308-2 that is opposite to surface 308-1. Surface 308-1 faces the one or more electronic displays (e.g., electronic displays 304-1 and 304-2). Reflective polarizer 302 reflects light from the one or more electronic displays toward reference pupil 310, which is optionally located on optical axis 316. In some embodiments, reflective polarizer 302 reflects light from the one or more electronic displays on surface 308-1, as shown in FIG. 3B. In some embodiments, reflective polarizer 302 reflects light from the one or more electronic displays on surface 308-2.

In some embodiments, surface 308-1 is a concave surface, defining optical axis 316, as shown in FIG. 3A. In some embodiments, surface 308-1 is a spherical surface (or a spheroidal surface). In some embodiments, surface 308-1 is a non-spherical surface (e.g., an ellipsoidal surface or a paraboloidal surface, such as an elliptic paraboloidal surface, or a flat surface). In some embodiments, surface 308-1 is a convex surface.

In some embodiments, surface 308-2 is a concave surface having optical axis 316. In some embodiments, surface 308-2 is a convex surface, as shown in FIG. 3A. In some embodiments, surface 308-2 is a spherical surface (or a spheroidal surface). In some embodiments, surface 308-2 is a non-spherical surface (e.g., an ellipsoidal surface or a paraboloidal surface, such as an elliptic paraboloidal surface, or a flat surface). In some embodiments, surface 308-2 has a curvature that corresponds to a curvature of surface 308-1.

In some embodiments, reflective polarizer 302 includes an optical substrate. Such substrates include glass (e.g., N-BK7, N-SF11, and F2; barium borate; barium fluoride; magnesium fluoride; sapphire; calcium fluoride; fused silica; calcite; etc.), plastics (e.g., thermoplastic polymers including polycarbonates), polymethylmethacrylate (PMMA), other optical substrate materials and/or any combination of thereof.

In some embodiments, reflective polarizer 302 includes a wire-grid polarizer (e.g., the wire-grid polarizer is located on surface 308-1). A wire grid polarizer includes thin wires positioned parallel to each other. In some embodiments, the wires are made of metal. A wire-grid polarizer reflects light polarized in the direction of the wires, and transmits light polarized in a direction that is perpendicular to the direction of the wires. In some embodiments, reflective polarizer 302 includes any other types of reflective polarizer (e.g., a thin film polarizer, a liquid crystal polarizer, or etc.). In some embodiments, reflective polarizer 302 includes a tunable polarizer (e.g., an electronically tunable polarizer). In some embodiments, reflective polarizer 302 includes a polarizer (e.g., a wire-grid polarizer) combined with one or more aligned quarter waveplates, for converting a circularly polarized light to a linearly polarized light.

Reflective polarizer 302 receives light patterns projected by electronic display 304-1. Reflective polarizer 302 reflects light of a first polarization and transmits light of a second polarization that is perpendicular to the first polarization. For example, reflective polarizer 302 reflects light with a vertical polarization and transmits light with a horizontal polarization, as shown in FIG. 3B. Alternatively, reflective polarizer 302 reflects light with the horizontal polarization and transmits light with the vertical polarization. In some embodiments, reflective polarizer 302 reflects light with a clockwise circular polarization and transmits light with a counterclockwise circular polarization. Alternatively, reflective polarizer 302 reflects light with the counterclockwise circular polarization and transmits light with the clockwise circular polarization.

A projection of a light pattern is shown with light 312 in FIG. 3B. In FIG. 3B, light 312 has a linear polarization in a vertical orientation (also called herein in a vertical polarization). An arrow symbol is used to indicate light with a vertical polarization and a circle symbol is used to indicate light with a horizontal polarization (e.g., a linear polarization in a horizontal orientation) in FIG. 3B.

In FIG. 3B, electronic display 304-1 projects light 312 having a vertical polarization, which is reflected by reflective polarizer 302. In some embodiments, electronic display 304-1 also projects light having a horizontal polarization, which is transmitted through reflective polarizer 302. In some embodiments, electronic display 304-1 forgoes projecting light having a horizontal polarization (e.g., electronic display 304-1 includes a linear polarizer that is vertically oriented to prevent outputting light having a horizontal polarization), as shown in FIG. 3B.

FIG. 3B also shows ambient light having a mixed polarization (e.g., the ambient light includes both portion 314 having a horizontal polarization and portion 324 having a vertical polarization). Portion 314, of ambient light, having a horizontal polarization is transmitted through reflective polarizer 302. A combination (e.g., an overlay or superposition) of light 312, from electronic display 304-1, having the vertical polarization and portion 314, of ambient light, having the horizontal polarization provides augmented reality image(s). For example, both light 312, from electronic display 304-1, having the vertical polarization and portion 314, of ambient light, having the horizontal polarization collectively form augmented reality image(s) on a retina of the eye. In FIG. 3B, reflective polarizer 302 reflects portion 324, of ambient light, having the vertical polarization.

By using the ambient light to form augmented reality images, reflective display device 300 does not need to collect the ambient light using a camera and process the collected ambient light for rendering with electronic displays 304-1 and 304-2. Thus, a compact and low-weight display device can be used for augmented reality operations, at least because an additional camera is not needed.

In some embodiments, reflective display device 300 includes one or more eye trackers (e.g., eye trackers 306-1 and 306-2 shown in FIG. 3B). In some embodiments, eye tracker 306-1 corresponds to eye tracking module 217 described above with respect to FIG. 2. An eye tracker (e.g., eye tracker 306-1) includes one or more optical sensors 326 (e.g., a single IR sensor, or a plurality of IR sensitive detectors, such as photodiodes) and one or more light sources 328 (e.g., IR light sources). In some embodiments, the eye tracker (e.g., eye tracker 306-1) is integrated with electronic display 304-1. In some embodiments, one or more light sources 328 are integrated with electronic display 304-1. Light source 328 projects light (e.g., infrared light) toward reflective polarizer 302 for tracking a position of an eye. At least a portion of the light is reflected toward reference pupil 310, which corresponds to the pupil of an eye of a user, or an area around reference pupil 310 (e.g., a cornea, retina, or crystalline lens of an eye). Optical sensor 326 detects light that has been retro-reflected from an eye (e.g., the retina, cornea, crystalline lens of an eye, or some combination thereof).

In some embodiments, in response to a determined location of pupil 310, adjustment module 218 (FIG. 2) adjusts the light projected by electronic displays 304-1 and 304-2 so that the reflected light output is transmitted toward the determined location of reference pupil 310, and not toward other locations in the eyebox.

In FIG. 3B, the distance between reference pupil 310 and surface 308-1 is described by distance D. In some embodiments, distance D is selected from a range between 10 mm and 60 mm (e.g., 10, 20, 30, 40, 50 or 60 mm). In some embodiments, reference pupil 310 is a pupil of an eye of a user.

Figure 4A:
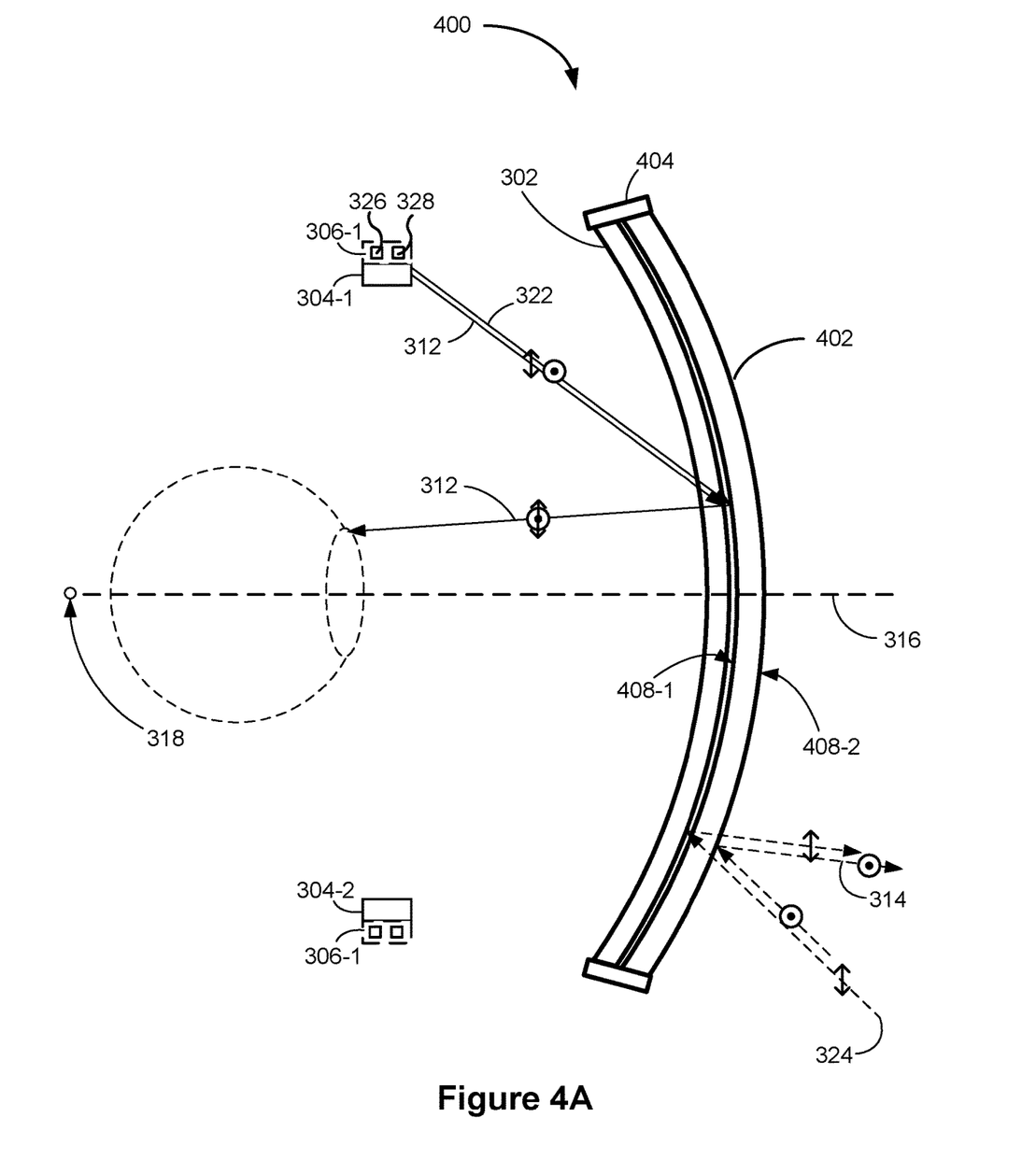
FIGS. 4A-4C illustrate reflective display devices in accordance with some embodiments.

FIG. 4A illustrates reflective display device 400 in accordance with some embodiments. Reflective display device 400 corresponds to reflective display device 300, with the exception that reflective display device 400 has reflective polarizer 402 in addition to reflective polarizer 302. Reflective polarizer has surface 408-1 facing surface 308-2. Surface is 408-2 opposite to surface 408-1. In some embodiments, surface 408-1 is a concave surface, as shown in FIG. 4A. In some embodiments, surface 408-1 is a spherical (or spheroidal) surface, as shown in FIG. 4A. In some embodiments, surface 408-1 is a non-spherical surface (e.g., a flat surface, an ellipsoidal surface, or a paraboloidal surface). In some embodiments, surface 408-2 is a concave surface. In some embodiments, surface 408-2 is a spherical (or spheroidal) surface. In some embodiments, surface 408-2 is a non-spherical surface (e.g., a flat surface, an ellipsoidal surface, or a paraboloidal surface). Reflective polarizer 402 reflects light of a particular polarization while transmitting light of a polarization that is perpendicular to the particular polarization.

The polarization of reflective polarizer 302 is distinct from polarization of reflective polarizer 402, so that reflective polarizer 402 reflects light with polarization that is transmitted by reflective polarizer 302. For example, when reflective polarizer 302 reflects light with a linear vertical polarization and transmits light with a linear horizontal polarization, reflective polarizer 402 reflects the light with the linear horizontal polarization (and optionally, transmits light with the linear vertical polarization, if any) (e.g., in FIG. 4A, electronic display 304-1 also projects light 322 having a horizontal polarization, which is transmitted through reflective polarizer 302 and reflected by reflective polarizer 402).

The configuration of reflective display device 400 allows for blocking ambient light from entering through reflective polarizers 402 and 302. In FIG. 4A, first portion 314, of ambient light, having a first polarization (e.g., the first polarization is parallel to an orientation of wires in reflective polarizer 402 and perpendicular to an orientation of wires in reflective polarizer 302) is reflected by reflective polarizer 402, as illustrated in FIG. 4A. Second portion 324, of ambient light, having a second polarization that is perpendicular to the first polarization (e.g., the second polarization is parallel to the orientation of wires in reflective polarizer 302), is transmitted through reflective polarizer 402. However, second portion 324, of ambient light, having the second polarization is reflected by reflective polarizer 302, as illustrated in FIG. 4A. The configuration of display device 400 allows display of virtual reality information, rather than augmented reality, because transmission of the ambient light is blocked or reduced.

In FIG. 4A, reflective polarizer 402 is removably coupled with reflective polarizer 302 with one or more couplers 404 (e.g., one coupler, two couplers, three couplers, etc.). In FIG. 4A, two couplers 404 are shown. Couplers allow coupling and de-coupling of reflective polarizer 402 with reflective polarizer 302. This allows switching the configuration of a display device between virtual reality operations (e.g., reflective display device 400) and augmented reality operations (e.g., reflective display device 300). This, in turn, allows the user to use the same display device for both virtual reality and augmented reality operations at respective times.

In some embodiments, surface 308-1 of reflective polarizer 302 and surface 408-1 of reflective polarizer 402 have a same center of curvature at point 318. This facilitate focusing light having the first polarization and light having the second polarization onto a same focal point.

Although FIG. 4A shows that there is an air gap between reflective polarizer 302 and reflective polarizer 402, in some embodiments, there is no air gap between reflective polarizer 302 and reflective polarizer 402. In some embodiments, a gap between reflective polarizer 302 and reflective polarizer 402 is filled with an optical material other than air. In some embodiments, surface 308-2 of reflective polarizer 302 is in contact with surface 408-1 of reflective polarizer 402.

Figure 4B:
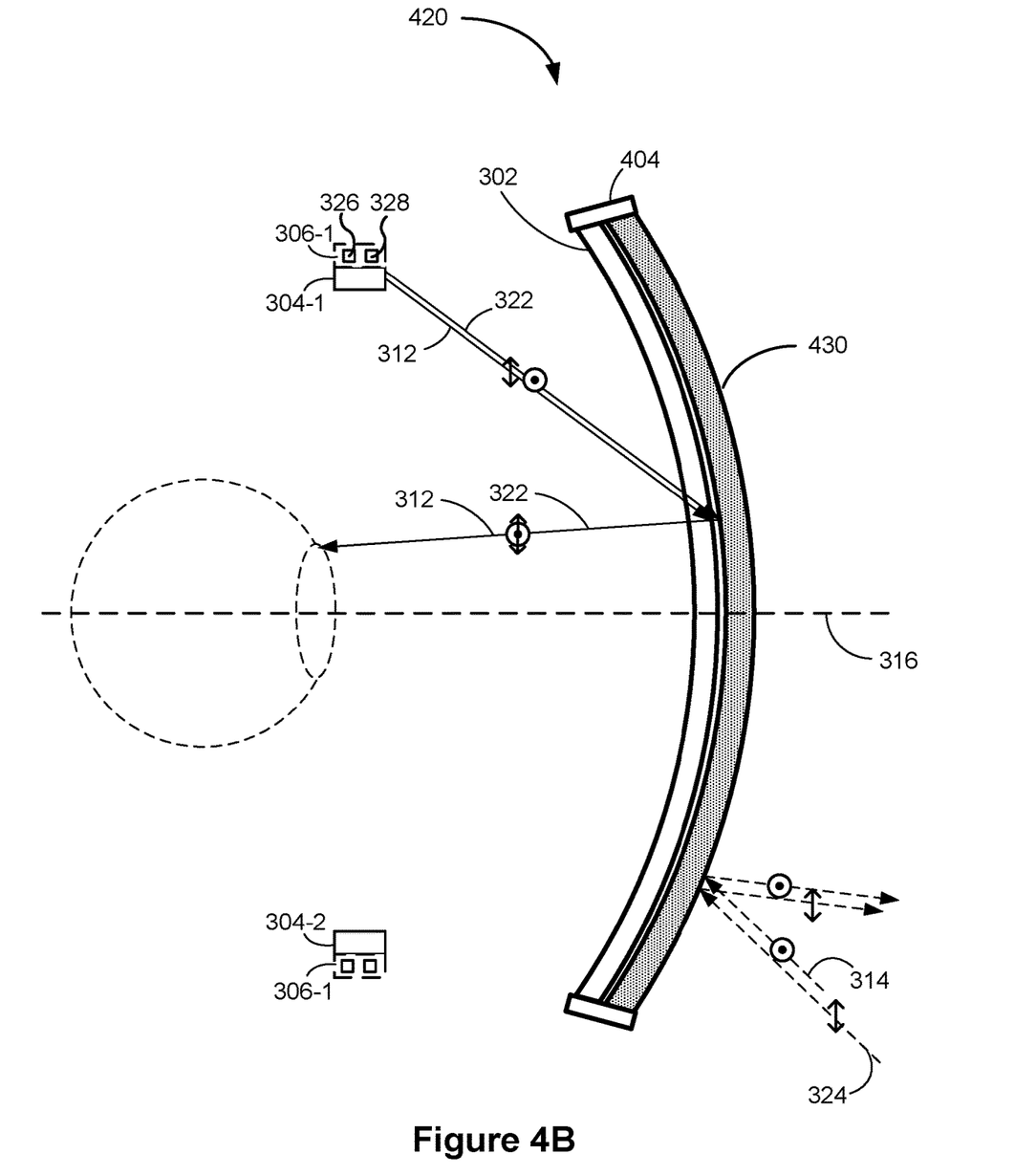

FIG. 4B illustrates reflective display device 420 in accordance with some embodiments. Reflective display device 420 is similar to reflective display device 400 except that reflector 430 is used in place of reflective polarizer 402. In some embodiments, reflector 420 is configured to reflect light independent of a polarization of the light. In such embodiments, all ambient light is reflected by reflector 430. In addition, all light from one or more electronic displays (e.g., electronic displays 304-1 and 304-2) are reflected by reflector 402 (except for a portion of the light already reflected by reflective polarizer 302). In some embodiments, reflector 420 is configured to reflect light impinging on a first surface (e.g., a surface facing reflective polarizer 302) and block light impinging on a second surface that is opposite to the first surface.

Figure 4C:
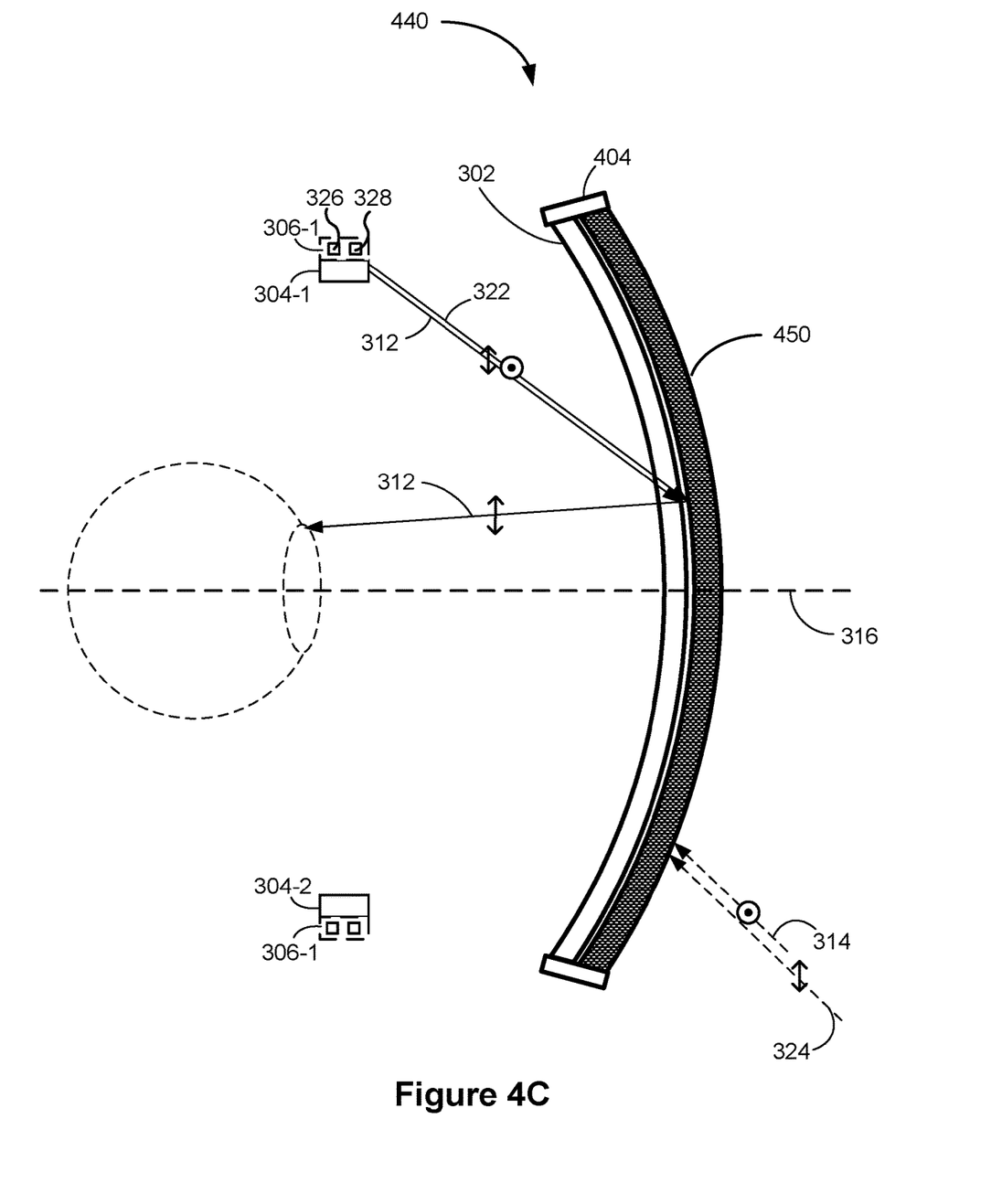

FIG. 4C illustrates reflective display device 420 in accordance with some embodiments. In FIG. 4C, blocker 450 is used in place of reflective polarizer 402 or reflector 430. In some embodiments, blocker 450 is configured to block transmission of visible light. In some embodiments, portion 322 of light (e.g., a portion having a horizontal polarization) from an electronic display (e.g., electronic display 304-1) is blocked (e.g., absorbed) by blocker 450. In some embodiments, ambient light (e.g., portions 314 and 324) are blocked (e.g., absorbed, reflected, and/or scattered) by blocker 450 regardless of its polarization.

Figure 5:
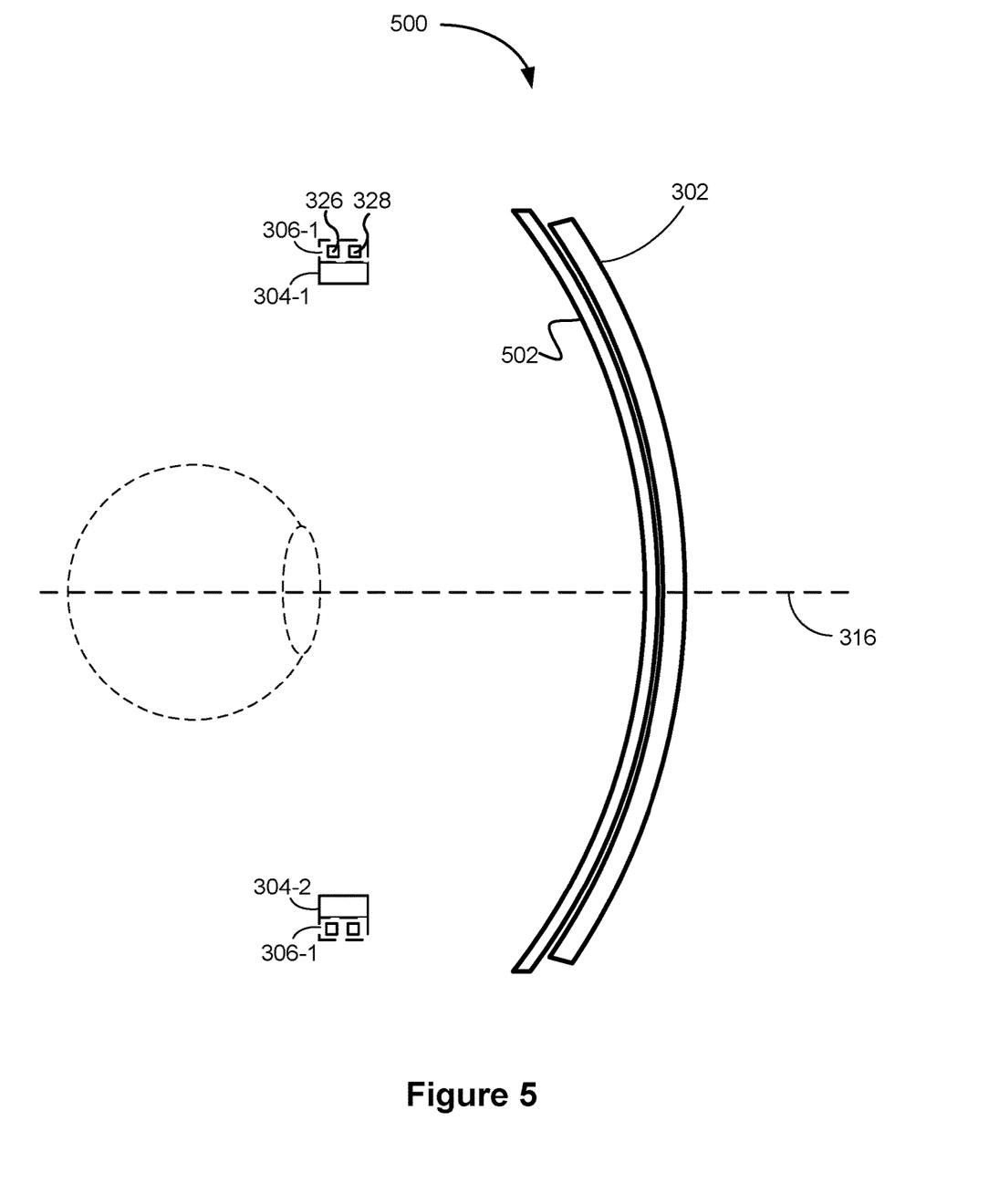
FIG. 5 illustrates a reflective display device in accordance with some embodiments.

FIG. 5 illustrates reflective display device 500 in accordance with some embodiments. Reflective display device 500 is similar to reflective display device 300, except that reflective display device 500 includes compensator 502. Compensator 502 is positioned adjacent to surface 308-1 of reflective polarizer 302. Compensator 502 is made of a transparent optical substrate (e.g., glass or plastic). In some embodiments, compensator 502 has a predefined, uniform thickness along the length of reflective polarizer 302. In some embodiments, the thickness of compensator 502 ranges from 50 µm to 100 µm (e.g., 50, 60, 70, 80, 90 or 100 µm). In some embodiments, the thickness of compensator 502 is less than 100 µm. In some embodiments, the thickness of compensator 402 is about 100 µm. In some embodiments, one or more surfaces of compensator 502 are textured (e.g., one or more surfaces of compensator 502 include microstructures). The textured surface(s) reduces a screen-door effect. In some embodiments, compensator 502 reduces chromatic aberration, thereby improving image quality of the computer-generated augmented reality images reflected by reflective polarizer 302. In some embodiments, compensator 502 includes a material that is selected to reduce chromatic aberration (e.g., by compensating for chromatic aberration induced by other optical elements).

In light of these principles, we now turn to certain embodiments of display devices.

In accordance with some embodiments, a head-mounted display device includes a first reflective polarizer having a first optical surface and a second optical surface that is opposite to the first optical surface. The first optical surface of the first reflective polarizer is curved, and the first reflective polarizer is configured to reflect light having a first polarization. The head-mounted display device also includes a first electronic display configured to project toward the first reflective polarizer a light pattern. At least a portion of the light pattern is reflected by the first reflective polarizer. For example, in FIG. 3, reflective display device 300 includes reflective polarizer 302 and electronic display 304-1. Reflective polarizer 302 has curved optical surface 308-1 and optical surface 308-2 that is opposite to optical surface 308-1. At least a portion of light pattern 312 (e.g., a portion of light pattern 312-1 having a particular polarization) projected by electronic display 304-1 is reflected by reflective polarizer 302. In some embodiments, light with a polarization that is perpendicular to the particular polarization is transmitted through reflective polarizer 302.

In some embodiments, the first optical surface of the first reflective polarizer includes a concave surface (e.g., surface 308-1 of reflective polarizer 302 is a concave surface as shown in FIG. 3). The first reflective polarizer has a reference axis (e.g., reflective polarizer 302 defines optical axis 316). The first electronic display is configured to project the light pattern toward the first optical surface of the first reflective polarizer so that the reflected light pattern is directed to a reference point on the reference axis (e.g., electronic display 304-1 projects light pattern 312 toward surface 308-1, which reflects light pattern 312 toward reference pupil 310 on optical axis 316).

In some embodiments, the first reflective polarizer is configured to transmit light having a second polarization that is distinct from the first polarization (e.g., reflective polarizer 302 reflects light 312 having a vertical linear polarization and transmits light 312 having a horizontal linear polarization).

In some embodiments, the head-mounted display device further includes a second reflective polarizer that is distinct and separate from the first reflective polarizer. The second reflective polarizer is configured to reflect light having the second polarization. For example, reflective display device 400 includes reflective polarizer 402, which is distinct and separate from reflective polarizer 302 in FIG. 4A. Reflective polarizer 402 reflects light having a horizontal linear polarization.

In some embodiments, the second reflective polarizer is removably coupled with the first reflective polarizer (e.g., reflective polarizer 402 is removably coupled with reflective polarizer 302 by couplers 404 in FIG. 4A). For example, in some cases, the second reflective polarizer can be separated and removed from the first reflective polarizer. In some embodiments, the second reflective polarizer is mechanically coupled with the first reflective polarizer by using friction coupling.

In some embodiments, the second reflective polarizer (e.g., reflective polarizer 402) is a tunable reflective polarizer. For example, the second reflective polarizer includes two substrates with electrodes, liquid crystals (e.g., nematic phase liquid crystals) located in between the substrates, and a linear polarizer. Based on the electrical field applied between the two substrates, the second reflective polarizer reflects or transmits the light having the second polarization (e.g., the tunable reflective polarizer is configured to transmit the light having the second polarization while an electrical field is applied and reflect the light having the second polarization while no electrical field is applied, or alternatively, the tunable reflective polarizer is configured to reflect the light having the second polarization while an electrical field is applied and transmit the light having the second polarization while no electrical field is applied). This allows a rapid switching between virtual reality operations and augmented reality operations.

In some embodiments, the second reflective polarizer has a third optical surface and a fourth optical surface that is opposite to the third optical surface. The third optical surface of the second reflective polarizer is curved. For example, in FIG. 4A, reflective polarizer 402 has curved surface 408-1 and surface 408-2 that is opposite to surface 408-1.

In some embodiments, the first optical surface of the first reflective polarizer includes a concave spherical (or spheroidal) surface, the third optical surface of the second reflective polarizer includes a concave spherical (or spheroidal) surface, and the second reflective polarizer is positioned so that a center of curvature of the first optical surface corresponds to a center of curvature of the third optical surface. For example, surface 308-1 of reflective polarizer 302 is a concave spherical surface and surface 408-1 of reflective polarizer 402 is a concave spherical surface in FIG. 4A. Surfaces 308-1 and 408-1 have a common center of curvature at point 318 as shown in FIG. 4A.

In some embodiments, the head-mounted display device further includes a reflector having a curved reflective surface. The reflector is removably coupled with the first reflective polarizer. For example, as shown in FIG. 4B, a broadband reflector (e.g., a metallic mirror, a dielectric mirror, etc.) is used.

In some embodiments, the first polarization is a linear polarization. For example, the first polarization is a horizontal or vertical polarization (e.g., light 312 has a vertical polarization in FIG. 3). In some embodiments, the first polarization is a circular polarization. For example, the first polarization is a clockwise circular polarization and the second polarization is a counterclockwise circular polarization.

In some embodiments, the head-mounted display device further includes a compensator made of an optical substrate. The compensator is positioned adjacent to the first optical surface of the first reflective polarizer. For example, reflective display device 500 includes compensator 502 positioned adjacent to surface 308-1 of reflective polarizer 302 in FIG. 5.

In some embodiments, the compensator includes a curved substrate having a predefined thickness along a length of the curved substrate (e.g., compensator 502 is a curved substrate with a predefined thickness along its length as shown in FIG. 5). In some embodiments, the thickness of compensator 502 is selected from a range between 50 μm and 100 μm (e.g., 50, 60, 70, 80, 90 or 100 μm). In some embodiments, the thickness of compensator 502 is about 100 μm.

In some embodiments, the head-mounted display device further includes a first eye tracker including a first optical sensor. The first optical sensor is configured to receive light reflected by the first reflective polarizer. For example, in FIG. 3, reflective display device 300 includes eye tracker 306-1. Eye tracker 306-1 includes optical sensor 326 that receives light retro-reflected by one or more portions of an eye and subsequently reflected by first reflective polarizer 302.

In some embodiments, the first eye tracker includes a light source configured to emit a tracking light (e.g., an infrared light) toward the first optical surface so that a reflected tracking light is directed toward an eye of a user (e.g., eye tracker 306-1 includes light source 328 that projects light toward surface 308-1 so that the reflected light is directed toward reference pupil 310). The first optical sensor is configured to receive a tracking light returning from the eye of the user, after the returning tracking light is reflected by the first reflective polarizer (e.g., eye tracker 306-1 has optical sensor 326 that receives light returning from the eye, reflected by surface 308-1).

In some embodiments, the head-mounted display device further includes a second eye tracker that is distinct and separate from the first eye tracker, the second eye tracker including a second optical sensor (e.g., in FIG. 3, reflective display device 300 includes eye tracker 306-2, which is separate and distinct from eye tracker 306-1 and includes optical sensor 326). The second optical sensor is configured to receive light reflected by the first reflective polarizer.

In some embodiments, the head-mounted display device further includes a second electronic display that is distinct and separate from the first electronic display and configured to project toward the first reflective polarizer a light pattern. At least a portion of the light pattern is reflected by the first reflective polarizer. For example, in FIG. 3, reflective display device 300 has electronic display 304-2, which is distinct and separate from electronic display 304-1. Electronic display 304-2 projects a light pattern toward reflective polarizer 302, and a portion of the light is reflected by reflective polarizer 302.

In accordance with some embodiments, a display device (e.g., reflective display device 300 in FIG. 3) includes a first reflective polarizer having a first optical surface and a second optical surface that is opposite to the first optical surface. The first optical surface of the first reflective polarizer is curved, and the first reflective polarizer is configured to reflect light having a first polarization. The display device also includes a first electronic display configured to project toward the first reflective polarizer a light pattern. At least a portion of the light pattern is reflected by the first reflective polarizer toward an eye of a user. In some embodiments, the display device is a head-mounted display device. In some embodiments, the display device is not a head-mounted display device.

In accordance with some embodiments, a method includes directing a light pattern from a first electronic display (e.g., 304-1 in FIG. 3B) toward a first reflective polarizer (e.g., reflective polarizer 302) having a first optical surface and a second optical surface that is opposite to the first optical surface. The first optical surface of the first reflective polarizer is curved. The method further includes reflecting, with the first reflective polarizer, at least a portion of the light pattern toward an eye of a user (e.g., light 312 is reflected by reflective polarizer 302).

In some embodiments, the method further includes coupling a second reflective polarizer (e.g., reflective polarizer 402) or a reflector (e.g., a mirror) with the first reflective polarizer (e.g., reflective polarizer 302) for virtual reality operations and removing the second reflective polarizer or the reflector from the first reflective polarizer for augmented reality operations. For example, in FIG. 4A, reflective polarizer 402 is coupled with reflective polarizer 302. Similarly, in FIG. 4B, reflector 430 is coupled with reflective polarizer 302. When reflective polarizer 402 (or reflector 430) is coupled with reflective polarizer 302, reflective display device 400 is configured for virtual reality operations (e.g., ambient light is blocked). When reflective polarizer 402 (or reflector 430) is removed, reflective display device 400 is configured for augmented reality operations (e.g., at least a portion of ambient light is transmitted through reflective polarizer 302).

In some embodiments, the method further includes configuring a second reflective polarizer (e.g., reflective polarizer 402 in FIG. 4, where reflective polarizer 402 is a tunable reflective polarizer) coupled with the first reflective polarizer (e.g., reflective polarizer 302) for virtual reality operations (e.g., activating reflective polarizer 402) and configuring the second reflective polarizer for augmented reality operations (e.g., deactivating reflective polarizer 402). In some embodiments, configuring the second reflective polarizer coupled with the first reflective polarizer for virtual reality operations includes aligning (e.g., rotating) the second reflective polarizer so that a polarization of the second reflective polarizer is perpendicular to a polarization of the first reflective polarizer, and configuring the second reflective polarizer coupled with the first reflective polarizer for augmented reality operations includes aligning (e.g., rotating) the second reflective polarizer so that the polarization of the second reflective polarizer is parallel to the polarization of the first reflective polarizer.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An eye-tracking device, comprising:
 a first reflective polarizer having a first optical surface and a second optical surface that is opposite to the first optical surface, wherein the first optical surface of the first reflective polarizer includes a curved surface and the first reflective polarizer has a first portion and a second portion that is mutually exclusive to the first portion;
 a first optical sensor positioned relative to the first reflective polarizer so that the first optical sensor receives a first tracking light reflected off of a first eye of a user, after the first tracking light is reflected by the first reflective polarizer, wherein:
  the first optical sensor is positioned adjacent to the first portion of the first reflective polarizer for receiving the first tracking light reflected by the first portion of the first reflective polarizer; and
  the eye-tracking device further includes a second optical sensor positioned adjacent to the second portion of the first reflective polarizer for receiving a second tracking light reflected off of the first eye of the user, after the second tracking light is reflected by the second portion of the first reflective polarizer; and
 a first light source positioned to emit the first tracking light toward the first portion of the first optical surface so that the first portion of the first optical surface reflects the first tracking light toward the first eye of the user; and
 a second light source distinct from the first light source positioned to emit the second tracking light toward the second portion of the first reflective polarizer so that the second portion of the first reflective polarizer reflects the second tracking light toward the first eye of the user.

2. The eye-tracking device of claim 1, wherein:
 the first reflective polarizer defines an optical axis; and
 the optical axis is positioned between the first portion and the second portion of the first reflective polarizer.

3. The eye-tracking device of claim 1, wherein:
 the first reflective polarizer is configured to transmit at least a portion of ambient light impinging on the second optical surface of the first reflective polarizer toward the first eye of the user.

4. The eye-tracking device of claim 1, wherein the first optical surface of the first reflective polarizer is a concave surface, a spherical surface, a convex surface, an ellipsoidal surface, or a paraboloidal surface.

5. A display device, comprising:
 the eye-tracking device of claim 1; and
 a first electronic display positioned to project first image light toward the first reflective polarizer so that at least a first portion of the first image light is reflected toward an eye of a user of the display device.

6. The display device of claim 5, wherein:
 the first reflective polarizer is configured to reflect light having a first polarization while transmitting light having a second polarization distinct from the first polarization; and
 the display device further includes a second reflective polarizer having a third optical surface and a fourth optical surface that is opposite to the third optical surface, the second reflective polarizer being distinct and separate from the first reflective polarizer and configured to reflect light having the second polarization.

7. The display device of claim 6, wherein the first optical surface of the first reflective polarizer and the third optical surface of the second reflective polarizer have a common center of curvature.

8. A display device, comprising:
 an eye-tracking device that includes:
  a first reflective polarizer having a first optical surface and a second optical surface that is opposite to the first optical surface, wherein the first optical surface of the first reflective polarizer includes a curved surface; and
  a first optical sensor positioned relative to the first reflective polarizer so that the first optical sensor receives a first tracking light reflected off of a first eye of a user, after the first tracking light is reflected by the first reflective polarizer; and
 a first electronic display positioned to project first image light toward the first reflective polarizer so that at least a first portion of the first image light is reflected toward an eye of a user of the display device, wherein:
  the first reflective polarizer is configured to reflect light having a first polarization while transmitting light having a second polarization distinct from the first polarization;
  the display device further includes a second reflective polarizer having a third optical surface and a fourth optical surface that is opposite to the third optical surface, the second reflective polarizer being distinct and separate from the first reflective polarizer and configured to reflect light having the second polarization; and
  the second reflective polarizer is an electronically tunable polarizer positioned to:
   while in a virtual reality mode, block light impinging on the fourth optical surface; and
   while in an augmented reality mode, transmit light impinging on the fourth optical surface toward the eye of the user of the display device.

9. The display device of claim 6, wherein the display device further includes:
a second electronic display distinct from the first electronic display positioned to project second image light toward the first reflective polarizer so that at least a first portion of the second image light is reflected toward an eye of a user of the display device.

10. A method, comprising:
reflecting, with the first reflective polarizer of the eye-tracking device of claim 1, a first tracking light reflected off of a first eye of a user; and
receiving, with the first optical sensor of the eye-tracking device, the first tracking light reflected by the first reflective polarizer.

11. The method of claim 10, wherein:
the first reflective polarizer has a first portion and a second portion that is mutually exclusive to the first portion;
the first optical sensor is positioned adjacent to the first portion of the first reflective polarizer for receiving the first tracking light reflected by the first portion of the first reflective polarizer; and
the method further includes:
reflecting, with the second portion of the first reflective polarizer, a second tracking light reflected off of the first eye of a user; and
receiving, with a second optical sensor, the second tracking light reflected by the second portion of the first reflective polarizer.

12. The method of claim 11, wherein:
the first reflective polarizer defines an optical axis; and
the optical axis is positioned between the first portion and the second portion of the first reflective polarizer.

13. The method of claim 11, further including:
emitting, with a first light source, the first tracking light toward the first optical surface so that the first optical surface reflects the first tracking light toward the first eye of the user.

14. The method of claim 13, further including:
emitting, with a second light source distinct from the first light source, the second tracking light toward the second portion of the first reflective polarizer so that the second portion of the first reflective polarizer reflects the second tracking light toward the first eye of the user.

15. The method of claim 10, further including:
transmitting, with the first reflective polarizer, at least a portion of ambient light impinging on the second optical surface of the first reflective polarizer toward the first eye of the user.

16. The method of claim 10, wherein the first optical surface of the first reflective polarizer is a concave surface, a spherical surface, a convex surface, an ellipsoidal surface, or a paraboloidal surface.

17. The display device of claim 8, wherein:
the second reflective polarizer includes liquid crystals between the third optical surface and the fourth optical surface.

* * * * *